United States Patent
Campione

(10) Patent No.: US 8,615,977 B2
(45) Date of Patent: Dec. 31, 2013

(54) SHEAR AND GRIND ROTARY MULCHING MOWER BLADE

(76) Inventor: Anthony C. Campione, Franklin, WI (US)

(*) Notice: Subject to any disclaimer, the term of this patent is extended or adjusted under 35 U.S.C. 154(b) by 0 days.

(21) Appl. No.: 13/429,344

(22) Filed: Mar. 24, 2012

(65) Prior Publication Data

US 2013/0247531 A1  Sep. 26, 2013

(51) Int. Cl.
*A01D 34/73* (2006.01)
(52) U.S. Cl.
USPC ............................................. 56/295
(58) Field of Classification Search
USPC ............. 56/229, 235, 255, 28, 295, DIG. 17, 56/DIG. 209
See application file for complete search history.

(56) References Cited

U.S. PATENT DOCUMENTS

| | | | | | |
|---|---|---|---|---|---|
| 2,737,003 | A | * | 3/1956 | Beers | 56/501 |
| 2,924,059 | A | * | 2/1960 | Beeston, Jr. | 56/295 |
| 3,247,657 | A | * | 4/1966 | Scarnato et al. | 56/295 |
| 3,315,451 | A | * | 4/1967 | Hill | 56/295 |
| 3,340,682 | A | * | 9/1967 | Ely | 56/295 |
| 3,444,675 | A | * | 5/1969 | Freedlander et al. | 56/295 |
| 3,910,017 | A | * | 10/1975 | Thorud et al. | 56/295 |
| 4,297,831 | A | * | 11/1981 | Pioch | 56/295 |
| 4,862,682 | A | * | 9/1989 | Wait et al. | 56/255 |
| 5,291,725 | A | * | 3/1994 | Meinerding | 56/295 |
| 5,452,569 | A | * | 9/1995 | Anderson | 56/295 |
| 5,515,670 | A | * | 5/1996 | Meinerding | 56/295 |
| 6,840,030 | B1 | * | 1/2005 | Monaco | 56/295 |
| 2002/0152736 | A1 | * | 10/2002 | Hasei et al. | 56/295 |
| 2004/0112028 | A1 | * | 6/2004 | Duncan et al. | 56/295 |
| 2010/0000193 | A1 | * | 1/2010 | De Benedetto et al. | 56/295 |

* cited by examiner

*Primary Examiner* — Thomas B Will
*Assistant Examiner* — Joan D Misa

(57) ABSTRACT

A rotary lawn mower blade that enhances the process of cutting, grinding, and ejecting lawn debris for the purpose of real-time nutrient recycling and visual aesthetics. The embodiment consists of a leading edge, interrupted transition, and an interrupted trailing face. The leading edge is maintained by sharpening the cutting edge until it intersects the bottom of the embodiment. The transition and trailing face has random interruptions of self-cleaning, sharp, jagged teeth that protrude above the blade surface. The jagged teeth are arranged to optimize the interaction between the clipping and the embodiment for the purpose of shredding and grinding. Centrifugal forces shear and grind the lawn clippings as they translate across the blade surface. The end result is an embodiment that shears and grinds lawn debris into small particles that break down in the environment at an accelerated rate to optimize the recycling process and augment visual appearance.

3 Claims, 4 Drawing Sheets

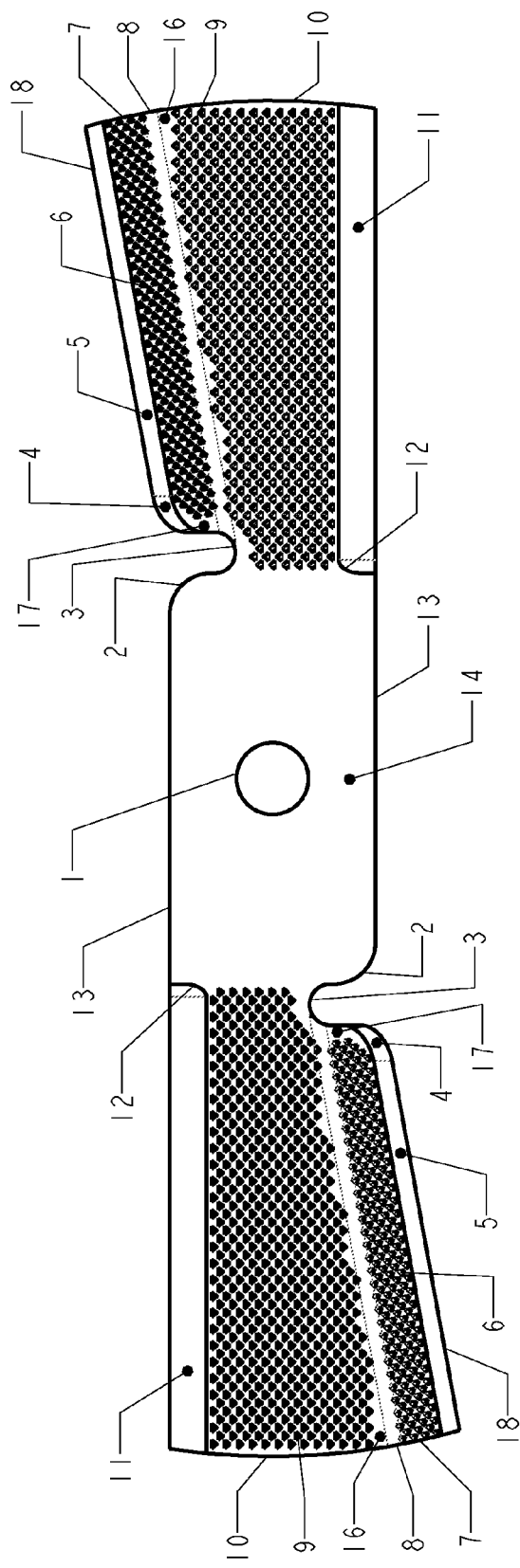
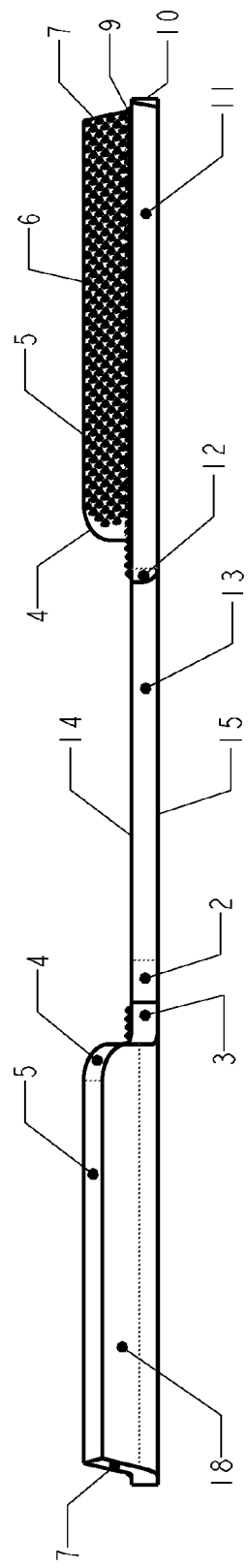
FIG. 1
FIG. 2

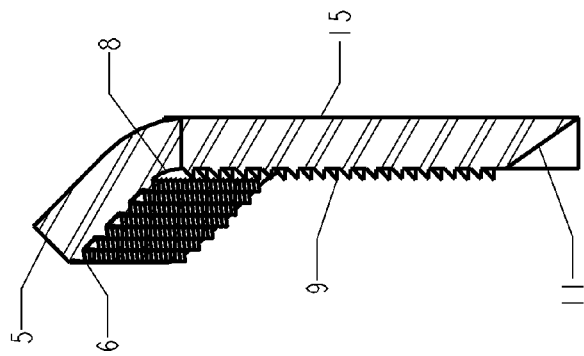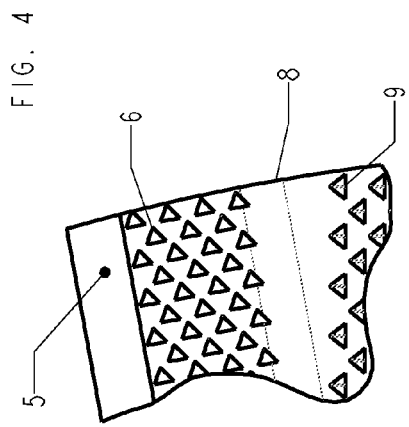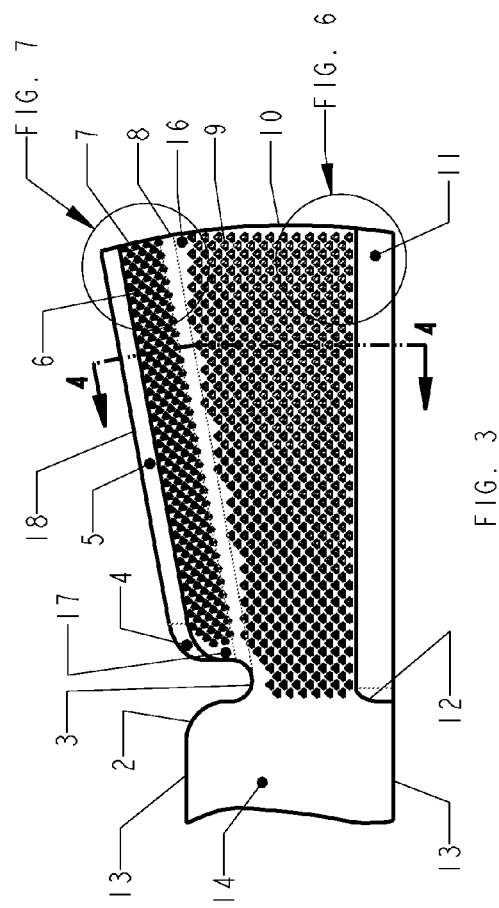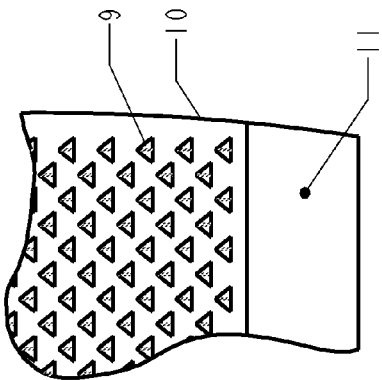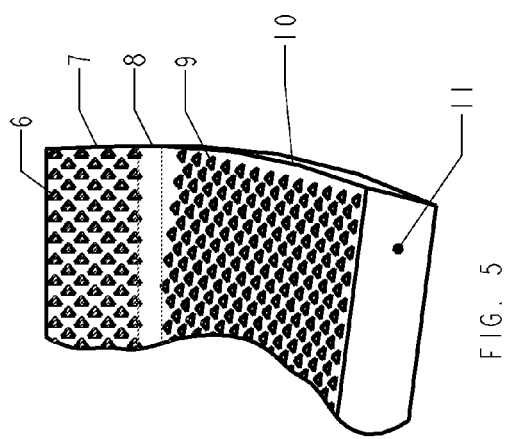

SHEAR AND GRIND ROTARY MULCHING MOWER BLADE

BACKGROUND OF THE INVENTION

In modern times, the practice of collecting lawn clippings when mowing lawn has declined. There are two primary reasons for this; the first is that regulatory requirements have become more stringent to impede the amount of yard waste deposited in landfills. The second is that research has proven that the practice of recycling lawn clippings back into the soil can help to enhance the nutrients and beautify lawn. The practice of recycling lawn clippings reduces the amount of fertilizers needed to maintain a thriving attractive lawn. The problem is that if lawn clippings are not shredded, the roots of the lawn are starved of oxygen and sunlight which are needed for growth; in addition to a poor, unfinished appearance. To overcome this problem, alternative lawn mower blades have been designed and are recognized in the industry as mulching blades.

The present invention focuses on refining the rotary lawn mower mulching blade by improving the effectiveness of shredding lawn clippings after the initial cut. The invention can be used on any style of rotary lawn mowing apparatus to include electric mowers, hand mowers, tractors, and commercial lawn care equipment which employ a rotary lawn mowing blade. Understand that the invention is not limited in use by equipment specifically designed for mulching blades; rather, this invention can be employed on rear discharge, side discharge, and mulching style lawn mowing decks.

SUMMARY OF THE INVENTION

The objective of this invention is to provide improvements in a rotary lawn mower blade that enhances the way lawn clippings are processed after the initial cut. The present invention grinds post cut clippings in a more efficient and succinct manner to ensure lawn root systems are not shadowed by lawn clippings. The invention functions in all types of lawn cutting conditions to include long, wet, and debris covered scenarios.

The invention is made of an embodiment that includes a center hole used for mounting to the rotary power equipment. The embodiment includes a leading edge that is sharpened at an angle followed by a trailing face that is bent upward at different rates to alter the amount of vacuum produced by the rotary blade when spinning. The space between the sharpened edge and the trailing lift edge are disrupted with sharp jagged teeth.

The invention lifts the blades of grass to a vertical stance by the trailing edge vacuum; produced when the blade is rotating at a high rate of speed. The blade of grass is then cut by the sharpened, leading edge of the rotary embodiment. The now cut grass clipping is traveling parallel with the leading edge of the rotary embodiment at a high rate of speed. The grinding occurs as the blade of grass translates across the disrupted, jagged teeth of the embodiment forcing a shear/shredding affect to a post cut clipping. The clipping can either eject upward to allow for the grind process to repeat by the second circumferential cut or the clipping ejects outward along the trailing feature face which includes sharp jagged teeth to precipitate further grinding. An alternate design to this invention can include a trailing edge inflection, which includes a compound angle to improve lawn lift for grinding and clipping ejection which also includes sharp, jagged teeth.

BRIEF DESCRIPTION OF THE DRAWINGS

FIG. 1 is a top view of the lawn mower blade embodying the invention.

FIG. 2 is a front view perspective of the embodiment shown in FIG. 1.

FIG. 3 is an enlarged top view of one end of the blade shown in FIG. 1.

FIG. 4 is an end view taken along section line 4-4 shown in FIG. 3.

FIG. 5 is an enlarged detail view of the end of the blade shown in FIG. 3.

FIG. 6 is an enlarged detailed view identified by as FIG. 6 with a leader arrow pointing to a detail balloon in FIG. 3.

FIG. 7 is an enlarged detailed view identified as FIG. 7 with a leader arrow pointing to a detail balloon in FIG. 3.

FIG. 8 is a top view of the simplified (all features not shown) embodiment.

FIG. 9 is an end view of the simplified (all features not shown) embodiment.

FIG. 10 is a front view of the simplified (all features not shown) embodiment.

Prior to a detailed description of the embodiment, let it be recognized that the invention is not limited in its' application, details of fabrication, and arrangements of the components set forth by the description or illustrations. The invention is adept of other embodiments and employed in alternative methods. Therefore, the terminology used herein is for the purpose of explanation and should not limit the present invention.

DETAILED DESCRIPTION OF THE INVENTION

The present invention is made from tuff; durable material such as steel that is processed in a series of sequences to form critical geometry. This geometry includes provisions for mounting, shearing, lifting, and grinding post cut lawn clippings and debris. The invention is reliable, durable, and performs in all mowing conditions to increase the speed in which post cut lawn clippings break-down into the soil. This invention effectively improves the look and finish of freshly cut lawn in addition to enhancing the cutting process in future weeks of the mowing season by reducing the amount and size of the lawn clippings.

Figure 9:
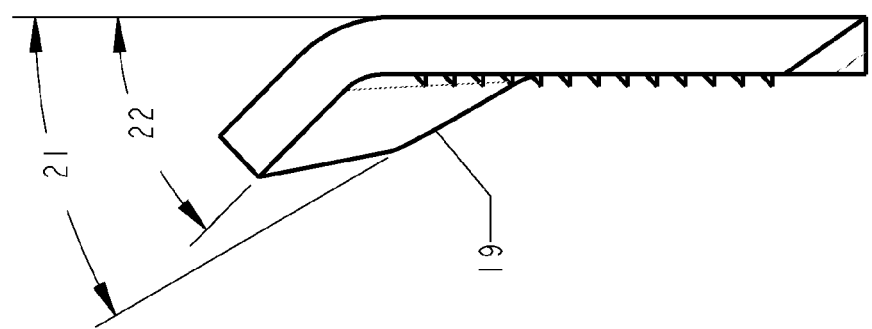
FIGS. 8, 9, and 10 are simplified (all features not shown) illustrations of an alternate blade end to facilitate the explanation of the trailing edge offset angle and alternate trailing edge configurations for various applications.
Figure 8:
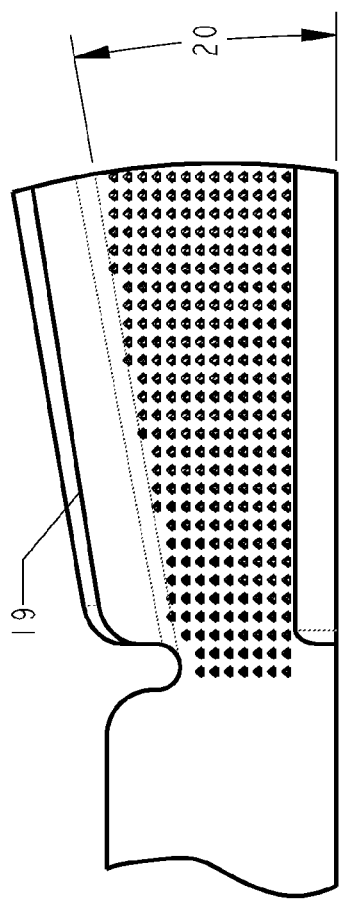
Figure 10:
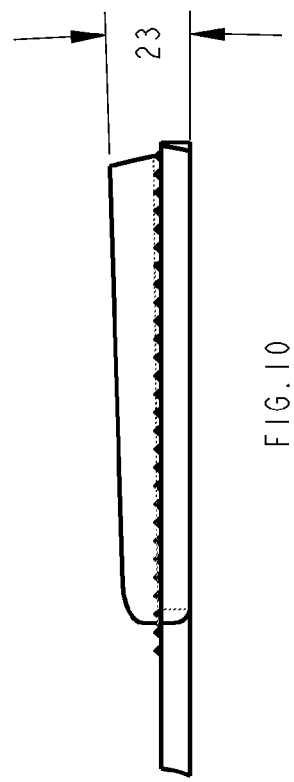
Figure 11:
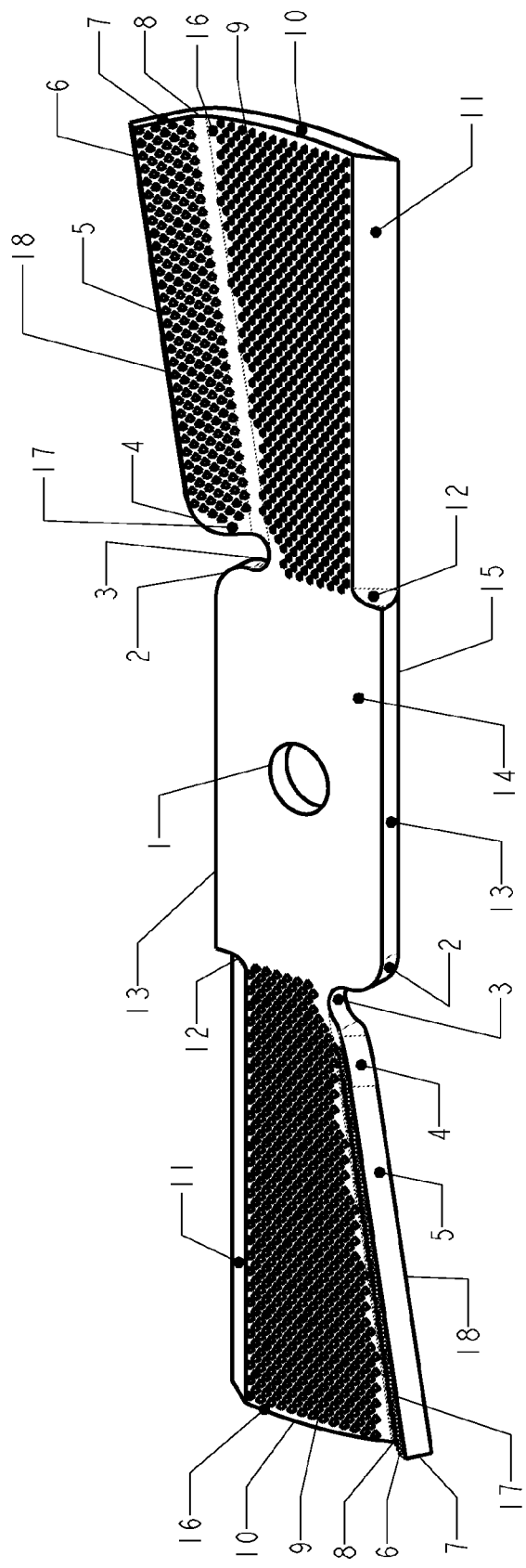
FIG. 11 is an isometric of the embodiment shown in FIG. 1.

FIGS. 1-7 illustrate the embodiment of the present invention. FIG. 8 is a simplified view (all features not shown) to illustrate an angle 22 at which the trailing edge is bent with respect to the leading edge 11 which will be explained in more detail later. FIG. 9 is a simplified view (all features not shown) to illustrate the trailing face angle and alternative designs of the embodiment to include a trailing edge with a compound bend angle which includes an inflection; again to be explained later. FIG. 10 is a simplified view (all features not shown) to illustrate alternate trailing edge face designs to be explained later. An isometric of the embodiment is represented by FIG. 11.

FIG. 1 is a top view of the rotary lawn mower blade 14 to include a through hole 1 to precipitate mounting to a rotating arbor shaft which is not shown in any of the provided figures. The embodiment 14 can be directly coupled to an internal combustion (IC) engine, electric motor, or mowing deck where the embodiment is driven by a power take off (PTO). Generally, item 14 will have a mounting arbor pass through hole 1 and will be clamped to the arbor utilizing a compression washer and bolt; not shown. The embodiment is generally clamped between a bolt/washer and arbor flange by applying a compressive force in the form of torque applied to the bolt head.

The embodiment 14 is rotated in a clockwise direction at a rate of speed necessary to perform work. The speeds will vary depending on the application and the device used to rotate the embodiment. The embodiment 14 is symmetrical at each end 7, 9, 10 of the blade and across the entire embodiment. This is necessary to facilitate both a static and dynamic balance which is essential to minimize vibration and uneven loads on arbor bearings when rotating. Edge 7, 9, 10 includes a radius at or larger than the overall length of the embodiment to provide end clearance necessary for rotation in what is referred to as the cutting deck.

Edge 13 in FIGS. 1-2 can be square (as shown), chamfered, have a radius, or include any suitable edge treatment. Edge 13 transitions into edge relief 12 and ultimately to the leading edge 11 which can be machined, ground, formed, stamped, or shaped using any process necessary to produce an angle that intersects the bottom edge of the blade. The leading edge 11 angle illustrated in FIGS. 3-6 is preferably between 20-45 degrees referenced from the bottom side of the embodiment. This edge is generally maintained to produce the cleanest cut possible by grinding, machining, or filing the edge.

FIG. 3 is an enlarged view of one end of the embodiment; with an understanding that each end of the blade is a mirror image, further description of the embodiment will focus on FIGS. 3-7 detailing one end of the blade and simplified (all features not shown) views FIGS. 8-10.

Primary cutting edge 11 intersects the top side of the embodiment 16. The top side 16 includes sharp, jagged teeth 9 that reside behind the primary cutting edge 11. The teeth 9 can be produced by forming, shaving, broaching, stamping, machining, or casting. The teeth arrangement may be uniform, random, offset, or any suitable arrangement to facilitate the most effective post cut clipping. The shape of each tooth 9 includes a vertex of material which stands proud of the top side 16 of the embodiment. The arrangement of the cutting teeth 9 can be uniform, random, offset, or any suitable arrangement to facilitate self-cleaning and shredding of the clipping. The shape of the tooth 9 size can be 0.100 inch wide by 0.068 inch tall, but the width and height can be any suitable size. The face of the tooth 9 employs sharp edges which are in direct line of action to the leading cutting edge 11. The jagged cutting teeth 9 can be sharpened using any suitable process such as filling, grinding, or honing.

FIG. 3, jagged teeth surface 16 transitions into radius 8 where trailing edge 5 is bent upward. This is to provide vacuum and lift which draws the lawn blade into a vertical stance prior to being cut by leading edge 11 of the embodiment. The height of edge 5 can range from 0.5-2.5 inches tall when referenced from the bottom face depending on the lift required for use. Generally, the trailing edge 5 is the same height along the entire surface. FIG. 10 is a simplified view illustrating an alternate design where the trailing edge angle 23 can increase or decrease for different cutting situations. The trailing edge 5 shown in FIG. 4. can have any suitable bend angle but preferably from 30-90 degrees and is bent about radius 8. To facilitate the ease of bending, FIG. 4 radius 8 intersects radius 3 FIG. 3. Radius 3 reduces internal stresses induced by the bending process. The bend angle 22 is represented in simplified view FIG. 9. Simplified view FIG. 9 also represents an alternate design to include bend angle 21 and bend angle 22 which results in a compound angle in face 19. This compound angle is used to cup clippings as they traverse along face 19 and are routed off the blade face. Either design trailing face 17, 19 include a bend radius 8 preferably at a 10 degree angle, but can be at any suitable angle between 5-15 degrees to the leading edge 11 which is represented in the simplified embodiment FIG. 8 detail 20.

FIG. 7, jagged teeth 6 are similar to 9 and reside on surface 17, 19 which are placed at preferably 45 degrees but can be at any suitable angle between 30-90 degrees to edge 11. The teeth 6 are produced by forming, shaving, broaching, stamping, machining, or casting. The shape of the tooth 6 includes a vertex of material which stands proud of the top side 17, 19 of the embodiment. The cutting teeth 6 can be uniform, random, offset, or any suitable pattern to facilitate self-cleaning and shredding of the clipping. Generally the tooth 6 can have a root width of 0.100 of an inch wide and peak of 0.068 of an inch tall, but the width and height can be any suitable size. The face of the tooth 6 employs sharp edges which shred the clipping. The jagged cutting teeth 6 can be sharpened using and suitable process such as filling, grinding, or honing.

The blade thickness 13 in FIG. 2 can be any suitable amount but generally between $3/16$-$3/8$ of an inch thick. The blade width FIG. 3 edge 13 to 13 can be any suitable dimension but generally ranges from 2-4 inches. The shear and grind FIG. 3 which encompasses cutting edge 11, jagged teeth 9 and surface 16, include jagged teeth 6 and surface 17, 19 generally increase in width toward the outward edge 10, 8, and 7. This width can be any suitable dimension, but generally ranges from 2-6 inches. The blade 14 can be made from any suitable material, but generally made from a high carbon, alloy steel. Processes used for fabrication can include, but are not limited to powdered metal, stamping, broaching, machining, or casting. The embodiment 14 can be treated with any suitable metal heat treatment to maintain edge wear, tooth wear, and toughness to withstand impact/fracture. The embodiment 14 can be treated with any suitable wear coating treatment or plating to aid with tooth life 6 and 9 and the leading edge 11. The embodiment 14 can be treated with any suitable corrosion protection to ensure robust and reliable service.

The present invention described above (FIGS. 1-11) defines an embodiment 14 that works when rotated at a high rate of speed. The surfaces 17, 19 and trailing edge 5 produce a vacuum which generates lift. The vacuum forces the lawn blade to stand perpendicular to sharped edge 11. Edge 11 shears the top section of the grass blade (not shown) off at the specified height. The post cut lawn clipping (not shown) translates from a perpendicular stance to a parallel stance to face 16. The clipping traveling parallel along face 16 is interrupted by jagged teeth 9 nested on transition face 16 which initiates the grinding process of the post cut clipping. The grind process occurs as the lawn blade impacts each tooth 9 as the blade of grass translates along face 16.

The post cut clipping (not shown) diminishes in size and shape as it traverses along face 16. The clipping velocity is translated upward to face 17 or 19 by radius 8. The clipping impacts jagged teeth 6 at an alternate angle to jagged teeth 9 which continues to grind the post cut clipping. Upon reaching face 17 or 19; the post cut clipping has two possible paths. Path one is that gravitational forces applied to the clipping maintain the material against face 17, 19 until it is ultimately ejected upward allowing it to be ground a third and fourth time as it intersects the opposite embodiment side two of the blade making a second circumferential cut. Path two; is that centrifugal forces act on the clipping by the rotating blade which cups the material and translates it along 17 or alternate design 19 where it continues to be ground up by jagged teeth 9 until ultimately is ejected to the side discharge or mulching deck baffles.

In general, the features of the embodiment can be, but are not limited to the following fabrication processes: powdered metal, casting, stamping, coining, broaching, and machining.

The invention claimed is:

1. A mulching blade for mounting on a rotary mower comprising:

an elongated flat member made of high carbon heat treated alloy steel, the elongated flat member defining a longitudinal axis and having opposed end edges and opposed side edges, said blade adapted for mounting onto said rotary mower for rotation about a center axis extended perpendicular to a plane created by the rotation, the center axis separating the blade into a pair of opposed elongated end portions extended from said center axis;

said blade as rotated about said center axis defining a leading edge and a trailing edge with a transition surface extending between said leading and trailing edges on each of the opposed elongated end portions;

said leading edges being sharpened to 35 degrees;

said trailing edges each having an upwardly deflected trailing face in order to create lift as the blade is rotated, said face being upwardly deflected at an angle between 45 and 65 degrees and further being offset 9.8 degrees along the longitudinal axis relative to the leading edge; and, both said transition surface and said trailing face further containing a plurality of jagged teeth, the number of teeth being substantially enough to cover the respective face and surface and extending outwardly therefrom, the teeth having a root width of not less than 0.1 inches and a height of 0.068 inches.

2. The mulching blade of claim 1, wherein the transition surface has a width of between 2.75 and 4.75 inches as measured along the longitudinal axis.

3. The mulching blade of claim 1, wherein the trailing face has a width of between 1 and 3 inches as measured along the longitudinal axis.

\* \* \* \* \*